United States Patent [19]

Seidensticker et al.

[11] 4,045,289

[45] Aug. 30, 1977

[54] NUCLEAR REACTOR CONTAINMENT STRUCTURE WITH CONTINUOUS RING TUNNEL AT GRADE

[75] Inventors: Ralph W. Seidensticker, Wheaton, Ill.; Robert L. Knawa; Bernard C. Cerutti, both of Idaho Falls, Idaho; Charles R. Snyder, Naperville, Ill.; William C. Husen, Whittier; Robert G. Coyer, Pasadena, both of Calif.

[73] Assignee: The United States of America as represented by the United States Energy Research and Development Administration, Washington, D.C.

[21] Appl. No.: 734,837

[22] Filed: Oct. 22, 1976

[51] Int. Cl.² .................................... G21C 13/02
[52] U.S. Cl. ............................ 176/87; 176/DIG. 2
[58] Field of Search ............ 186/87, DIG. 2; 52/224, 52/248

[56] References Cited
U.S. PATENT DOCUMENTS

| 3,022,238 | 2/1962 | Kolflat | 176/DIG. 2 |
| 3,258,403 | 6/1966 | Malay | 176/DIG. 2 |
| 3,320,969 | 5/1967 | Gordon | 176/DIG. 2 |
| 3,793,145 | 2/1974 | Jordan et al. | 176/87 |
| 3,850,794 | 11/1974 | Laurer et al. | 176/87 X |

OTHER PUBLICATIONS

Containment Radiation Control, & Siting, Power Reactor Technology, vol. 6, No. 3, p. 23.

*Primary Examiner*—Peter A. Nelson
*Attorney, Agent, or Firm*—Dean E. Carlson; Frank H. Jackson

[57] ABSTRACT

A nuclear reactor containment structure which includes a reinforced concrete shell, a hemispherical top dome, a steel liner, and a reinforced-concrete base slab supporting the concrete shell is constructed with a substantial proportion thereof below grade in an excavation made in solid rock with the concrete poured in contact with the rock and also includes a continuous, hollow, reinforced-concrete ring tunnel surrounding the concrete shell with its top at grade level, with one wall integral with the reinforced concrete shell, and with at least the base of the ring tunnel poured in contact with the rock.

2 Claims, 1 Drawing Figure

U.S. Patent  Aug. 30, 1977  4,045,289
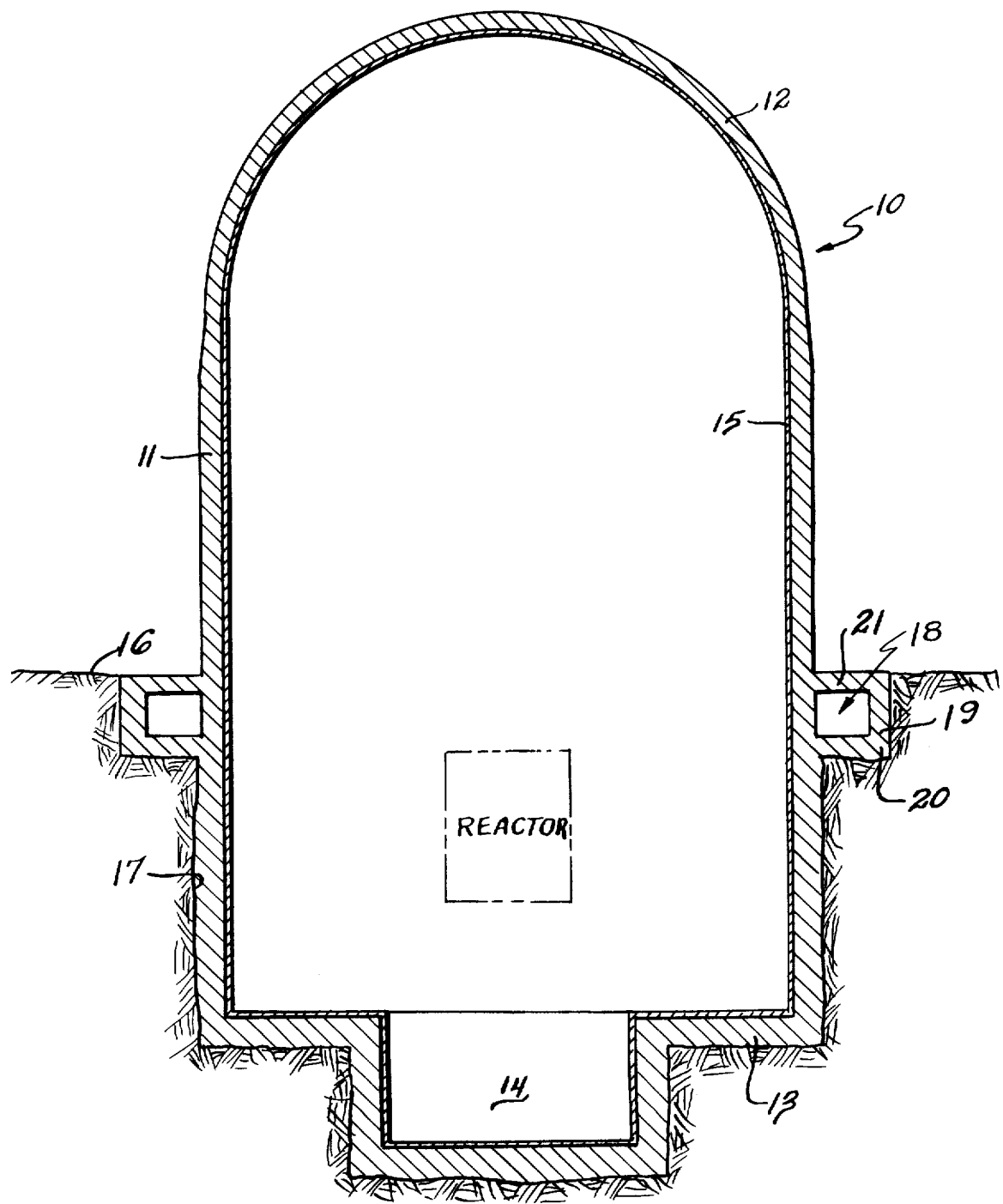

NUCLEAR REACTOR CONTAINMENT STRUCTURE WITH CONTINUOUS RING TUNNEL AT GRADE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a nuclear reactor containment structure. In more detail, the invention relates to a reactor containment building having excellent resistance to wind and seismic forces. In still more detail, the invention relates to a reactor containment building for a Safety Research Experiment Facility which is designed to be used to investigate the performance and safety characteristics of fuels and fuel assemblies for large fast breeder reactors.

Many nuclear reactors are enclosed within containment structures which conventionally are free standing steel or reinforced-concrete steel-plate-lined cylindrical shells with a top dome. The entire structure generally rests on a thick reinforced-concrete base slab. This structure is the final barrier preventing release of radioactive material to the atmosphere as a result of accidental occurrences within the containment. It is a passive element of the safety system — a static fission product barrier which must perform its safety function under all postulated operating and accident conditions.

The depth of embedment of a nuclear reactor containment structure — i.e., the depth below grade of the main foundation slab — can range from very shallow embedment to virtually full embedment. The degree of embedment can have a profound effect on the forces for which the structure must resist, and can affect overall cost. For example, conventional containment structures which are primarily above grade must resist very high shear forces and overturning moments due to wind and seismic loads. While a structure can be designed and constructed to serve the intended purpose, the cost is probably greater than for a structure with a greater degree of embedment. Likewise, a containment structure which is fully embedded having its top at or slightly below grade would probably be substantially more expensive than a partially embedded structure due to increased excavation costs.

A partially embedded reactor containment building accordingly has potential cost advantages over either shallow embedment or full embedment. Generally, such advantages depend upon the nature of the soil environment, and can be realized only if significant reductions in the shear forces and overturning moments from lateral loads can be accomplished.

SUMMARY OF THE INVENTION

The reactor containment building of a safety research experiment facility is constructed of reinforced concrete partially embedded in competent rock with the concrete poured in contact with the competent rock and includes a continuous, hollow, circular, reinforced-concrete ring tunnel surrounding the shell of the reactor containment building with its top at grade and having one wall integral with the containment building shell and at least its base poured in contact with the competent rock.

BRIEF DESCRIPTION OF THE DRAWING

The FIG. is a sketch showing a reactor containment building constructed in accordance with the present invention.

DETAILED DESCRIPTION OF THE INVENTION

As shown in the drawing, a reactor containment building 10 according to the present invention comprises a vertically disposed, right cylindrical shell 11 provided with a hemispherical top dome 12 and resting on a base mat 13 having a well 14 at the center thereof to accommodate control rod drives. The reactor containment building is constructed of reinforced concrete and is provided with a steel liner 15. Reactor containment building 10 extends a substantial distance below grade 16 in an excavation 17 made in competent rock and the portion thereof below grade is poured directly in contact with the rock.

A circular, hollow, reinforced-concrete ring tunnel 18 surrounds shell 11 of the reactor containment building 10 and has one wall integral therewith. It also includes a vertical wall 19 spaced from shell 11, a bottom wall 20 and a top wall 21 which is disposed at approximately grade level 16. Ring tunnel 18 is poured with at least the base thereof in contact with surrounding competent rock.

Having thus described the invention generally, it will now be described specifically as envisioned for construction as part of the Safety Research Experiment Facility which is now being planned for construction at the Idaho National Engineering Laboratory, Idaho Falls, Idaho. The Safety Research Experiment Facility includes a helium gas cooled test reactor and support facilities, all of which are to be used to investigate the performance and safety characteristics of fuels and fuel assemblies for large fast breeder reactors. Several different core configurations have been developed for safety experiments of different radial sizes.

The reactor containment building is 110 feet in inside diameter with an overall height of 214 feet. The building extends 70 feet below grade excluding the depth of the well which is itself 25 feet deep and 47 feet in diameter, the excavation being made in lava rock. The radius of the dome is 55 feet and it is 133 feet from the spring line of the dome to the top of the base mat. The dome is 2 ¼ feet in thickness, the shell is 3 feet thick at the ring tunnel, the lower portion of the shell is 3 ½ feet thick and the steel liner is ⅜ inch thick. The ring tunnel has 3-foot-thick walls and is 12 feet high and 12 feet wide in interior dimensions.

By placing the below-grade concrete walls and slabs in direct contact with surrounding competent rock, the rock is in effect caused to act as a part of the containment structure. Further, use of a very rigid reinforced-concrete ring tunnel in contact with the rock at or near grade effectively and efficiently transmits lateral loads from seismic and wind forces, acting on the structure above grade, to the rock foundation at or near grade level. Not only is the remaining below-grade portion of the containment free of such lateral loads, resulting in significant cost saving in total reinforcing steel requirements, but the absolute value of such loads is significantly less than for a free-standing containment structure.

If a free-standing containment were to be designed, the wall thickness would increase by at least 6 inches, the steel reinforcement density would increase from 400 to 800 pounds per cubic yard of concrete and the outside area requiring formwork would essentially double. In addition, the amount of reinforcing steel located at the juncture of the concrete walls and foundation mat (or slab) would increase greatly, and the greater congestion of reinforcement would increase the cost and complexity of this juncture. The benefits gained from placing the concrete directly against the rock clearly outweigh the extra precautions required during rock excavation.

The ring tunnel also provides convenient space for routing most of the piping and wiring around the containment so that wall penetrations may be optimized with respect to layout problems within the reactor containment building.

The embodiments of the invention in which an exclusive property or privilege is claimed are defined as follows:

1. A containment structure for a nuclear reactor comprising a vertically disposed, right circular cylindrical shell provided with a top dome and resting on a base mat, said shell, dome and base mat being constructed of steel-lined reinforced concrete, said structure being partially embedded in competent rock with the concrete thereof being in contact with the rock and including a hollow, reinforced-concrete ring tunnel continuously encircling said cylindrical shell and surrounding the shell with its top at grade, having one wall integral with the cylindrical shell, and with at least the base of the ring tunnel being poured in contact with the rock.

2. Containment structure according to claim 1 wherein said ring tunnel is formed by a vertical wall spaced away from the shell and top and bottom walls, said ring tunnel being 12 feet high and 12 feet wide and said vertically disposed shell being embedded 70 feet below grade, the distance between the spring line of the dome and the top of the base mat being 133 feet.

* * * * *